May 9, 1961 R. H. OLSON 2,983,077
MACHINE FOR GATHERING AND TRANSFERRING
MOLD CHARGES OF MOLTEN GLASS
Filed Sept. 19, 1957 4 Sheets-Sheet 2
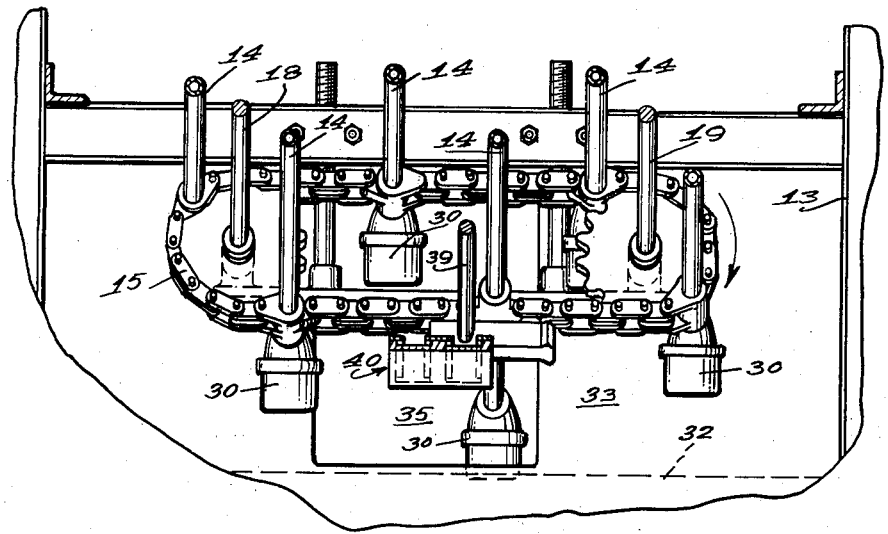
Fig. 2.
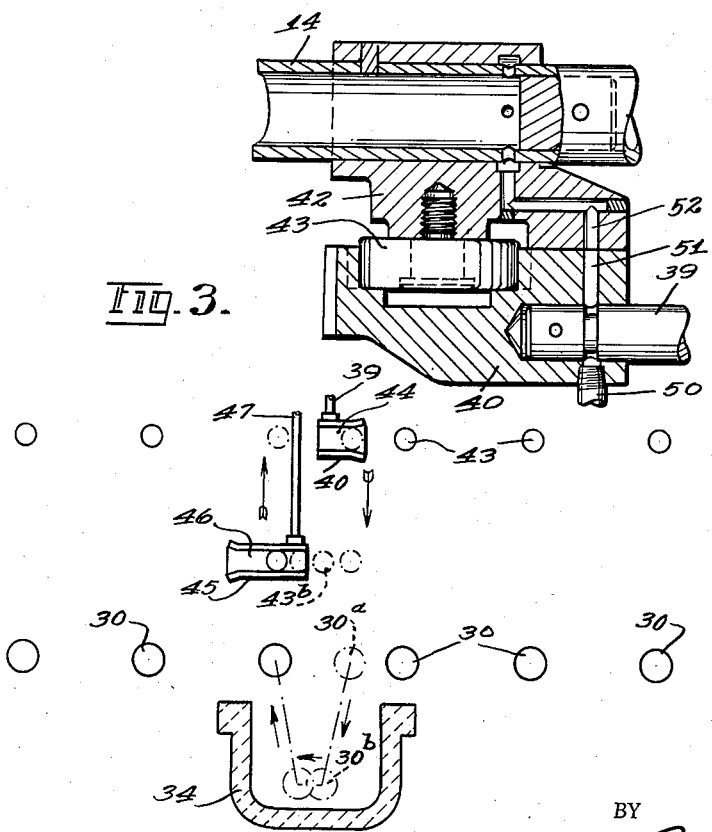
Fig. 3.
Fig. 4.
INVENTOR.
RALPH H. OLSON
BY
Rule & Hoge,
ATTORNEYS

INVENTOR.
RALPH H. OLSON

May 9, 1961
R. H. OLSON
2,983,077
MACHINE FOR GATHERING AND TRANSFERRING
MOLD CHARGES OF MOLTEN GLASS
Filed Sept. 19, 1957
4 Sheets-Sheet 4
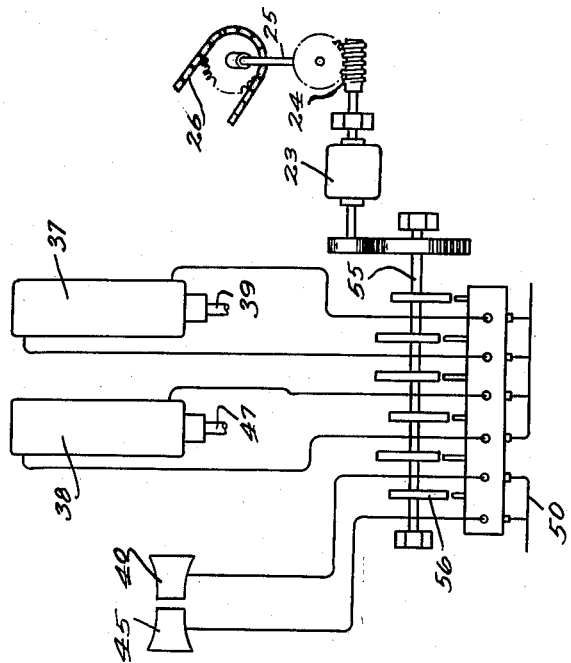
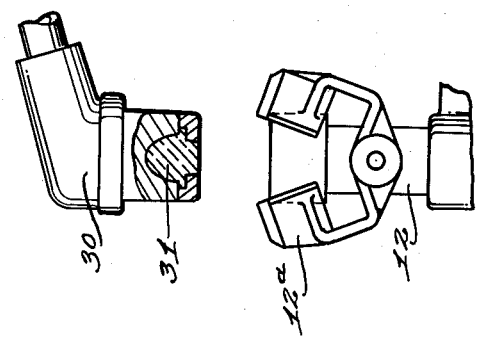
INVENTOR.
RALPH H. OLSON
BY
*Rule & Hoge,*
ATTORNEYS United States Patent Office 2,983,077
Patented May 9, 1961

2,983,077
MACHINE FOR GATHERING AND TRANSFERRING MOLD CHARGES OF MOLTEN GLASS

Ralph H. Olson, Toledo, Ohio, assignor to Owens-Illinois Glass Company, a corporation of Ohio Filed Sept. 19, 1957, Ser. No. 684,917

4 Claims. (Cl. 49—62)

My invention relates to mechanism for gathering charges of molten glass from a furnace tank and transferring them to the spindles of a glass forming machine. The mechanism comprises a plurality of gathering rams with attached glass gathering heads. The rams are projected lengthwise singly and in succession to bring the gathering heads into contact with the pool of molten glass in the tank and gather the charges of glass by suction. Each ram when retracted brings the gathered charge of glass over a spindle on the forming machine and drops the gathered blank or mold charge on to the spindle.

The prior art includes machines in which a pair of gathering rams are employed. The rams are projected as a unit to gather the charges of glass, then retracted and simultaneously release the mold charges, to spindles on the glass forming machine. In such a machine the gathering heads travel horizontally in one direction while gathering the charges of glass and move horizontally in a reverse direction while delivering the charges to the traveling spindles. With this mode of operation the two gathering heads move in different paths while in contact with the glass in the tank and also move in separate paths while delivering the charges to the spindles of the forming machine.

An object of the present invention is to avoid objectionable features characteristic of such prior art machines. In accordance with the invention each of the gathering rams travels in the same path so that each gathering head moves in the same path while in contact with the glass in the furnace tank and this tends to uniformity of the entire cycle of operations of each succeeding ram. The gathered charges or blanks are also delivered singly and in succession to the spindles of the forming machine, with each ram moving in the same path during such delivery.

Other objects of the invention will appear hereinafter.

Referring to the accompanying drawings:

Fig. 2 is a section at the line 2—2 on Fig. 1;

Fig. 3 is a detailed sectional view showing connecting means between a gathering ram and piston by which the ram is projected;

Fig. 4 is a schematic view illustrating the path of the gathering heads on the rams and the means for projecting and retracting the gathering heads;

Fig. 6 is a fragmentary view showing a gathering head and a spindle to which the glass is transferred; and Fig. 7 is a diagrammatic view of the timer mechanism and parts controlled thereby.

Figure 1:
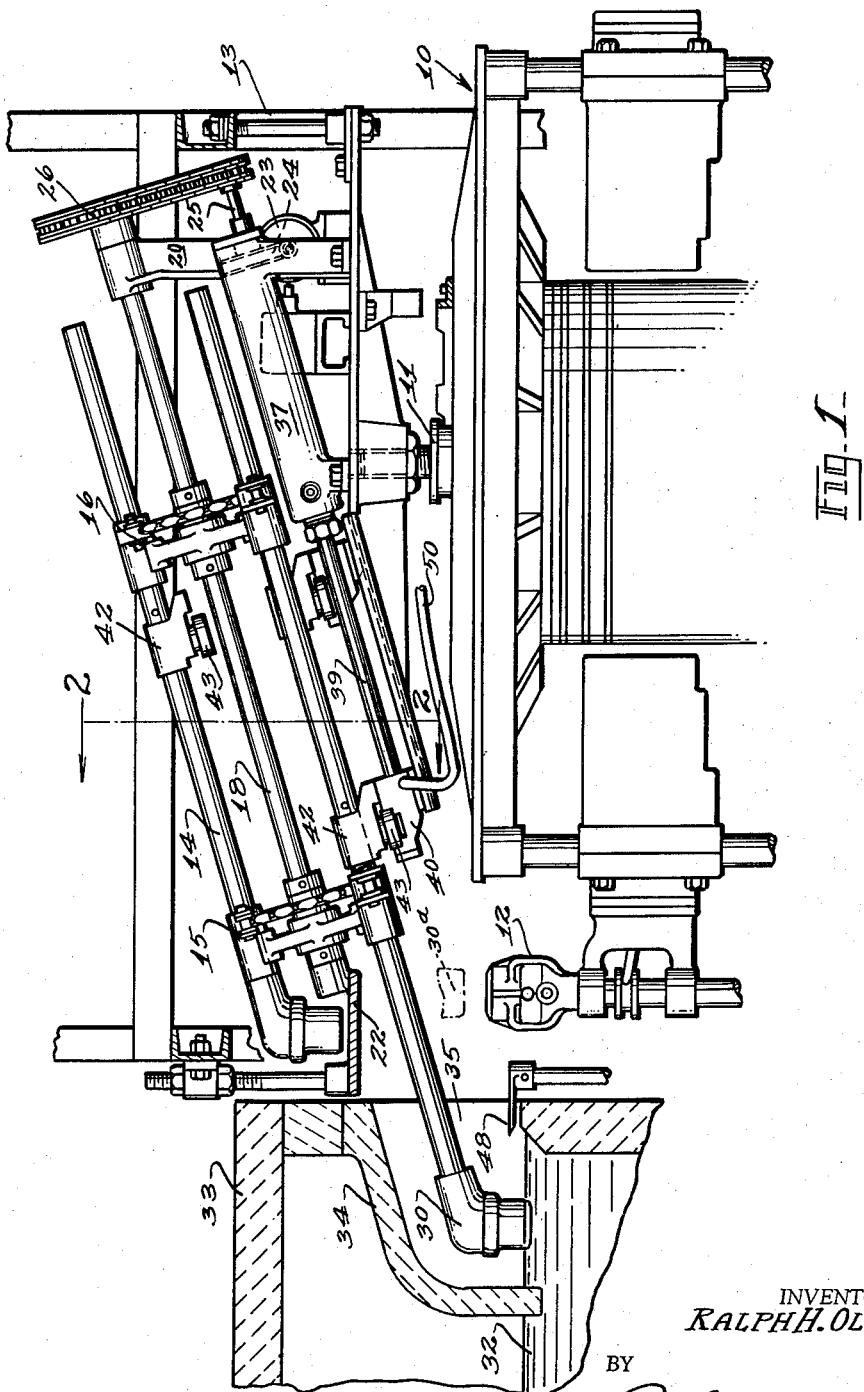
Fig. 1 is a part sectional elevation of the ram gathering mechanism and the forming machine.

Referring to Fig. 1, the apparatus for gathering mold charges and transferring them is shown in connection with a glass forming or molding machine of a type used in the manufacture of stemware. The machine comprises a carriage 10 which is continuously rotated about the vertical axis of a stationary column 11. The machine comprises spindles 12 which may be arranged in an annular series and to which the mold charges are delivered by the gathering rams. A stationary framework 13 provides a support for a plurality of gathering rams 14 and their operating mechanism.

In the form illustrated six gathering rams 14 are each connected to endless chain conveyors 15 and 16 by concentrically aligned pairs of journal members by which the rams are carried and moved continuously in a closed path. The chains 15, 16 are trained over driving sprockets on a drive shaft 18 and a driven shaft 19. The drive shaft 18 is journalled near its upper end in a standard 20 on the frame 13 and at its opposite end is journalled in a bearing on a stationary frame member 22. The shaft 18 is driven by an electric motor 23. Driving connections between the motor and the shaft 18 include a worm gearing 24, shaft 25 and a sprocket chain 26 trained over sprockets on the shafts 25 and 18.

Figure 5:
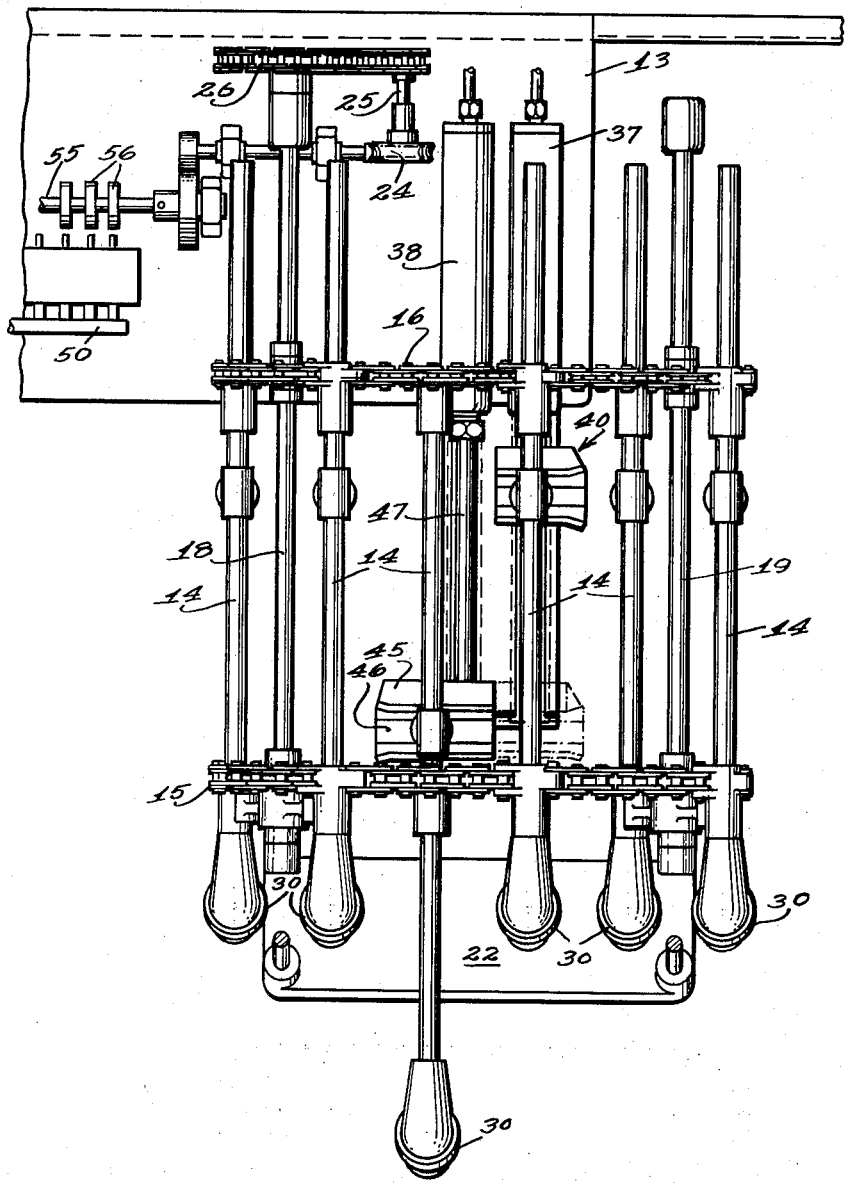
Fig. 5 is a plan view of the gathering rams and their operating mechanism.

The rams 14 through their normal mountings on the chains 15 and 16 are arranged in parallel relation, and are traveling continuously in the same closed path, and are spaced apart at equal distances as measured along their path of travel. The rams are downwardly and forwardly inclined. This inclination of the rams is established through the inclination of the mounting of the parallel shafts 18 and 19 as provided by the standard 20 and vertically adjustable frame member 22. Each ram carries at its forward or lower end a gathering head or mold 30 for gathering mold charges or blanks 31 (Fig. 6). The rams are mounted in journal members connected with the links of chains 15 and 16 (Figs. 1, 2, and 5) so that the rams are slidable for reciprocation lengthwise for projecting the gathering heads into contact with the pool of molten glass 32 within a furnace tank 33. A hood 34 defines a gathering area and shields the main body of glass in the tank from the opening 35 through which the gathering heads are projected.

The rams are projected singly and in succession to gathering position by a piston motor 37 and are retracted by a piston motor 38. The piston motors have a stationary mounting on the frame 13 and are arranged parallel with the gathering rams. The piston rod 39 of the motor 37 has keyed to its lower end a head 40 to which the rams are operatively connected in succession. Each ram 14 has mounted thereon and keyed thereto a block 42 to which is attached a roll 43. The roll 43 is carried so that its radial plane is disposed parallel with its ram 14, the track 44 of the head 40, and the track 46 of the head 45. The head 40 is formed with a channel or cam groove 44 into which the roll 43 enters during its horizontal travel, thereby providing a driving connection between the piston rod 39 and the ram when the latter reaches a position to be projected for gathering a mold charge. The motor 37 then operates to project the ram. During this movement the gathering head 30 is carried from the broken line position 30ᵃ (Fig. 4) to the position 30ᵇ in which the gathering head is in contact with the pool of glass.

A head 45 formed with a cam track 46 is attached to the piston rod 47 of the motor 38. As the cam roll 43 on the projected ram leaves the track 44 it enters the track 46 which at this time is in register therewith, the head 45 being in its projected position as shown in Fig. 4. The piston rod 47 is then retracted, withdrawing the gathering head 30 to the discharge position 30ᵃ (Figs. 1 and 6) in which it is directly over a spindle 12. The mold charge is then released in the usual manner, as shown, for example, in the patent to Kadow, 1,645,755, October 18, 1927, and drops on to the spindle. The heads 40 and 45 prevent any rotative movement of the ram about its axis while the roll 43 on the ram is traversing the tracks 44, 46 and thereby hold the gathering head 30 with its face downward. When a ram with its mold charge is withdrawn from the furnace a knife 48 severs the glass therein from the supply body.

Suction for drawing the glass into a gathering mold is supplied through a suction line including a suction pipe 50 connected to the head 40, a channel 51 (Fig. 3) in the head 40 and a channel 52 extending through the block 42 to the tubular ram 14. The channels 51 and 52 are brought into register while the gathering mold is in contact with the pool of glass. The head 45 may also be formed with a channel in the suction line and brought into register with the channel 52 while the mold 30 is in dip.

A timer mechanism (Fig. 7) controls the operation of the motors 37 and 38 and also controls the application of suction to the gathering heads. This mechanism includes a timer shaft 55 connected through a train of gearing of the motor 23. Cams 56 on the timer shaft operate corresponding valves controlling the air pressure supply to the motors 37 and 38 and also operate valves in the suction line 50.

A résumé of the operation is as follows:

The gathering rams 14 travel continuously in a closed path, the movement being at all times perpendicular to the axes of the rams. As each ram nears the gathering position the roll 43 carried thereby engages the head 40. The piston motor 37 then projects the gathering head into the tank. Suction is then applied for gathering the mold charge. During this gathering operation the cam roll 43 runs from the head 40 into the head 45. The motor 38 then withdraws the head 45 bringing the gathering mold to a position over a spindle 12 directly thereebeneath. The mold charge is then released and drops into the open jaws 12ᵃ of the spindle which then grips the charge.

Modifications may be resorted to within the spirit and scope of my invention as defined in the appended claims.

I claim:

1. A machine for gathering charges of molten glass from a pool of glass in a tank and transferring the charges to a glass forming machine, said glass gathering machine comprising a multiplicity of gathering rams, supporting means by which the rams are supported in parallel relation with the rams extending downwardly and forwardly from said supporting means, gathering heads attached to the forward ends of the rams, means for continuously driving the rams in a closed path with the rams maintained in said parallel relation and moving in directions perpendicular to their axes, the rams being uniformly spaced along said path, a piston motor comprising a cylinder having a stationary mounting and a piston rod parallel with the rams, a connecting head attached to the piston rod and formed with a track, rolls individual to the rams and connected to travel therewith, said rolls arranged to run in said track each during a charge gathering operation thereby providing an operating connection between the motor piston and each ram, means for operating said motor and thereby projecting the gathering heads into contact with the pool of glass, a second piston motor mounted parallel with the first mentioned motor and including a piston rod, a second connecting head attached to the latter piston rod and formed with a track, said tracks being brought into register while the gathering head is in charge gathering position permitting the roll to run from the first head to the second head while the charge of glass is being gathered, and means for operating said second motor for withdrawing the ram and bringing the mold charge to a discharging position.

2. The combination set forth in claim 1, the means for driving the rams in a closed path comprising endless chain conveyors to which the rams are attached, and means for driving said conveyors.

3. A machine for gathering charges of glass from a supply of molten glass and transferring them to a glass forming machine, said gathering machine comprising a ram, carriage means for continuously supporting and moving the ram in a closed path, driving means engaging said carriage means and defining said closed path of movement therefor, said driving means being actuatable for imparting movement to said carriage means in said path, means attaching the ram to said carriage means permitting reciprocating axial movement of the ram, the latter being disposed at all times with its axis perpendicular to the direction of movement of the carriage means in said path and with the ram extending from said carriage means in a downwardly and forwardly inclined direction and with said direction unchanged throughout the travel of the ram with said carriage means, power means connected to said driving means for continuously actuating the latter, a gathering head carried by the ram at its forward end, means for projecting the ram forwardly in the direction of its length for bringing the gathering head into contact with a pool of molten glass for gathering a charge of glass, and means for withdrawing the ram with its charge of glass.

4. The combination set forth in claim 3, the means for projecting the ram comprising a reciprocating piston motor including a cylinder having a stationary mounting and a piston rod extending parallel with the ram, a connecting head on the piston rod, a roll carried by the ram, said head having a track in which the roll runs and means for operating the piston motor for moving the gathering head to gathering position, and the means for withdrawing the ram comprising a second reciprocating piston motor including a cylinder having a stationary mounting and a piston rod extending parallel with the ram and spaced in the direction of movement of the ram from the piston rod of the first-named motor, a connecting head on the piston rod of said second motor and formed with a track in which the roll of the ram runs, means for operating the second piston motor for holding its track in register with the track of the first motor when the gathering head is in gathering position to receive the roll of the ram during movement of the latter in said closed path, and for thereafter moving the gathering head to withdraw the ram and bring the gathered charge of glass to a discharge position.

References Cited in the file of this patent

UNITED STATES PATENTS

| | | |
|---|---|---|
| 1,223,393 | Kadow | Apr. 24, 1917 |
| 1,894,030 | Dowling | Jan. 10, 1933 |
| 2,002,889 | Geer et al. | May 28, 1935 |